US008656307B2

(12) United States Patent
Miura et al.

(10) Patent No.: US 8,656,307 B2
(45) Date of Patent: Feb. 18, 2014

(54) INFORMATION STORAGE MEDIUM, COMPUTER TERMINAL, AND CHANGE METHOD

(75) Inventors: Yohei Miura, Kawasaki (JP); Takashi Kohara, Sagamihara (JP); Kaori Kurosawa, Saitama (JP)

(73) Assignee: Namco Bandai Games Inc., Tokyo (JP)

( * ) Notice: Subject to any disclaimer, the term of this patent is extended or adjusted under 35 U.S.C. 154(b) by 1032 days.

(21) Appl. No.: 12/574,952

(22) Filed: Oct. 7, 2009

(65) Prior Publication Data

US 2010/0088604 A1 Apr. 8, 2010

(30) Foreign Application Priority Data

Oct. 8, 2008 (JP) ................................. 2008-262181

(51) Int. Cl.
G04B 13/00 (2006.01)
(52) U.S. Cl.
USPC .......................................... 715/823; 715/727
(58) Field of Classification Search
USPC ......... 715/727, 728, 729, 770, 771, 772, 802, 715/803, 805, 821, 705–712, 790, 860, 862, 715/823; 84/478, 609, 636; 434/307; 704/278; 345/473–474
See application file for complete search history.

(56) References Cited

U.S. PATENT DOCUMENTS

| 8,047,906 | B2 * | 11/2011 | Yamazaki et al. | 463/7 |
| 8,246,460 | B2 * | 8/2012 | Kitahara | 463/37 |
| 2001/0032539 | A1 * | 10/2001 | Chantzis et al. | 84/478 |
| 2002/0005109 | A1 * | 1/2002 | Miller | 84/609 |
| 2003/0014262 | A1 * | 1/2003 | Kim | 704/278 |
| 2005/0031212 | A1 * | 2/2005 | Suino | 382/232 |
| 2006/0009979 | A1 * | 1/2006 | McHale et al. | 704/270 |
| 2006/0130635 | A1 * | 6/2006 | Rubang | 84/464 A |
| 2007/0000374 | A1 * | 1/2007 | Clark et al. | 84/724 |
| 2007/0150082 | A1 * | 6/2007 | Yang et al. | 700/94 |
| 2007/0256540 | A1 * | 11/2007 | Salter | 84/485 R |
| 2007/0256543 | A1 * | 11/2007 | Evans et al. | 84/609 |
| 2008/0034948 | A1 * | 2/2008 | Sumita | 84/636 |
| 2008/0115656 | A1 * | 5/2008 | Sumita | 84/612 |
| 2008/0140401 | A1 * | 6/2008 | Abrash et al. | 704/251 |
| 2008/0184870 | A1 * | 8/2008 | Toivola | 84/610 |
| 2008/0188305 | A1 * | 8/2008 | Yamazaki et al. | 463/36 |
| 2008/0220797 | A1 * | 9/2008 | Meiby et al. | 455/466 |
| 2009/0307207 | A1 * | 12/2009 | Murray | 707/5 |

FOREIGN PATENT DOCUMENTS

| JP | 2005292222 A | * | 10/2005 |
| JP | 2007024989 A | * | 2/2007 |
| JP | B2-3905469 | | 4/2007 |
| JP | 2009031549 A | * | 2/2009 |
| JP | 2010085481 A | * | 4/2010 |

OTHER PUBLICATIONS

Dance Dance Revolution Disney's Rave, Dengenki Play Station, Media Works, vol. 6, No. 32, Dec. 8, 2000, 138 and 139 (with Partial English Translation).

* cited by examiner

Primary Examiner — Steven Sax
(74) Attorney, Agent, or Firm — Oliff PLC

(57) ABSTRACT

A computer terminal changes the non-evaluation property of one of the reference timings to the evaluation property based on a result of the evaluation conducted by comparing one of the reference timings having the evaluation property with the timing of the input performed by the operator.

5 Claims, 13 Drawing Sheets

FIG.6A

| NOTE | REFERENCE TIMING | PLACEMENT POINT |
|---|---|---|
| A1 | T12 | Q1 |
| A2 | T13 | Q2 |
| A3 | T15 | Q3 |
| A4 | T16 | Q4 |
| A5 | T17 | Q5 |
| A6 | T18 | Q6 |
| A7 | T19 | Q7 |
| A8 | T20 | Q8 |
| ⋮ | ⋮ | ⋮ |

FIG.6B

| NOTE | REFERENCE TIMING | PLACEMENT POINT |
|---|---|---|
| A1 | T12 | Q1 |
| A3 | T15 | Q3 |
| A5 | T17 | Q5 |
| A7 | T19 | Q7 |
| ⋮ | ⋮ | ⋮ |

INFORMATION STORAGE MEDIUM, COMPUTER TERMINAL, AND CHANGE METHOD

Japanese Patent Application No. 2008-262181, filed on Oct. 8, 2008, is hereby incorporated by reference in its entirety.

BACKGROUND OF THE INVENTION

The present invention relates to an information storage medium, a computer terminal, and a change method.

A computer terminal that allows the operator (player) to enjoy a pseudo-performance by performing a predetermined input along with the music has been known. Such a computer terminal displays an instruction mark (e.g., note) that moves along a predetermined path at a predetermined moving speed, and compares the input timing of the operator with a reference timing to evaluate the input performed by the operator (see Japanese Patent No. 3905469).

However, since such a computer terminal has an evaluation target in a uniform pattern, the operator may lose interest in the game.

SUMMARY

According to a first aspect of the invention, there is provided a computer-readable information storage medium storing a program that performs processing for reproducing music data and evaluating an input performed by an operator, the program causing a computer to function as:

a storage section that stores a plurality of reference timings having an evaluation property or a non-evaluation property for the music data;

an evaluation section that conducts an evaluation of the input performed by the operator by comparing one of the reference timings having the evaluation property with a timing of the input performed by the operator; and a change section that changes the non-evaluation property of one of the reference timings to the evaluation property based on a result of the evaluation conducted by comparing one of the reference timings having the evaluation property with the timing of the input performed by the operator.

According to a second aspect of the invention, there is provided a computer terminal that reproduces music data and evaluates an input performed by an operator, the computer terminal comprising:

a storage section that stores a plurality of reference timings having an evaluation property or a non-evaluation property for the music data;

an evaluation section that conducts an evaluation of the input performed by the operator by comparing one of the reference timings having the evaluation property with a timing of the input performed by the operator; and a change section that changes the non-evaluation property of one of the reference timings to the evaluation property based on a result of the evaluation conducted by comparing one of the reference timings having the evaluation property with the timing of the input performed by the operator.

According to a third aspect of the invention, there is provided a change method that is implemented by a computer terminal that reproduces music data, evaluates an input performed by an operator, and includes a processor, the method comprising:

storing a plurality of reference timings having an evaluation property or a non-evaluation property for the music data;

conducting an evaluation of the input performed by the operator by comparing one of the reference timings having the evaluation property with a timing of the input performed by the operator; and changing the non-evaluation property of one of the reference timings to the evaluation property based on a result of the evaluation conducted by comparing one of the reference timings having the evaluation property with the timing of the input performed by the operator.

BRIEF DESCRIPTION OF THE SEVERAL VIEWS OF THE DRAWING

FIGS. 6A and 6B are tables illustrating the relationship among a note that is set to a display state from a non-display state, a reference timing, and an placement point.

DETAILED DESCRIPTION OF THE EMBODIMENT

Figure 1:
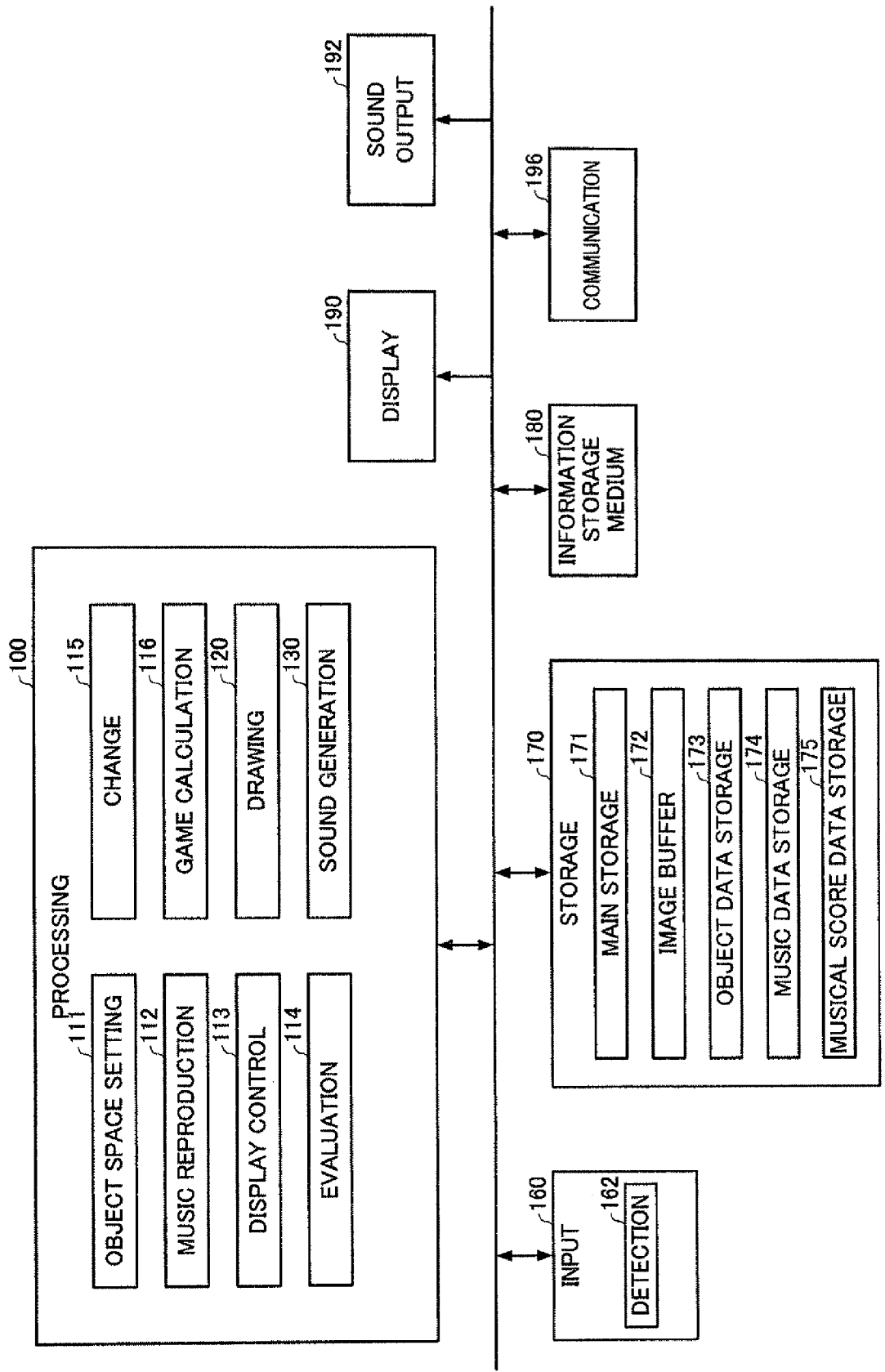
FIG. 1 is a functional block diagram illustrating a computer terminal according to one embodiment of the invention.

The invention may provide an information storage medium, a computer terminal, and a change method that enable various types of instruction mark display control in a game that reproduces music data and evaluates an input performed by an operator (or a player).

(1) According to one embodiment of the invention, there is provided a computer-readable information storage medium storing a program that performs processing for reproducing music data and evaluating an input performed by an operator, the program causing a computer to function as:

a storage section that stores a plurality of reference timings having an evaluation property or a non-evaluation property for the music data;

an evaluation section that conducts an evaluation of the input performed by the operator by comparing one of the reference timings having the evaluation property with a timing of the input performed by the operator; and a change section that changes the non-evaluation property of one of the reference timings to the evaluation property based on a result of the evaluation conducted by comparing one of the reference timings having the evaluation property with the timing of the input performed by the operator.

According to one embodiment of the invention, there is provided a computer terminal comprising the above-described sections.

According to the above embodiments, since the non-evaluation property of the reference timing is changed to the evaluation property based on the evaluation result for the operator's input that is conducted by comparing the reference timing having the evaluation property with the input timing of the operator, various types of evaluations can be implemented.

(2) In each of the information storage medium and the computer terminal, the change section may change the non-evaluation property of one of the reference timings within a predetermined period to the evaluation property.

According to the above configuration, the non-evaluation property of the reference timing within the appropriate period can be changed to the evaluation property only by previously setting an appropriate period to be the predetermined period.

(3) In each of the information storage medium and the computer terminal, the change section may change the non-evaluation property of a predetermined one of the reference timings to the evaluation property based on the result of the evaluation for the input performed by the operator.

This makes it possible to implement various types of evaluations that reflect the evaluation result for the operator's input that is conducted by comparing one of the reference timings having the evaluation property with the input timing of the operator.

(4) The information storage medium and the computer terminal may causes the computer to further function as or may further comprise:

a display control section that moves instruction marks respectively representing the reference timings having the evaluation property along a moving path toward a predetermined point on the moving path, wherein the display control section moves one of the instruction marks representing one of the reference timings having the evaluation property that has been changed from the non-evaluation property radially from around the predetermined point and then along the moving path.

This makes it possible for the operator to immediately grasp that there is a reference timing having the evaluation property that has been changed from the non-evaluation property. Moreover, a situation in which an instruction mark representing one of the reference timings having the evaluation property breaks to generate a new instruction mark can be displayed.

(5) The information storage medium and the computer terminal may cause the computer to further function as or may further comprise:

a display control section that moves instruction marks respectively representing the reference timings having the evaluation property along a moving path toward a predetermined point on the moving path, wherein the display control section moves one of the instruction marks representing one of the reference timings having the evaluation property that has been changed from the non-evaluation property from around the predetermined point to a placement point on the moving path and then along the moving path, the placement point corresponding to the one of the instruction marks.

According to the above configuration, the operator can immediately grasp that there is a reference timing having the evaluation property that has been changed from the non-evaluation property. Moreover, since the instruction mark representing one of the reference timings having the evaluation property that has been changed from the non-evaluation property is moved to the placement point that corresponds to the instruction mark, on the moving path, the operator can predict an approach of the reference timing having the evaluation property that has been changed from the non-evaluation property.

(6) According to one embodiment of the invention, there is provided a change method that is implemented by a computer terminal that reproduces music data, evaluates an input performed by an operator, and includes a processor, the method comprising:

storing a plurality of reference timings having an evaluation property or a non-evaluation property for the music data;

conducting an evaluation of the input performed by the operator by comparing one of the reference timings having the evaluation property with a timing of the input performed by the operator; and changing the non-evaluation property of one of the reference timings to the evaluation property based on a result of the evaluation conducted by comparing one of the reference timings having the evaluation property with the timing of the input performed by the operator.

Some embodiments of the invention will be described below. Note that the embodiments described below do not unduly limit the scope of the invention as stated in the claims. Also, not all the elements described below should be taken as essential requirements of the invention.

1. Configuration

FIG. 1 illustrates an example of a functional block diagram of a computer terminal (game system or image generation device) according to one embodiment of the invention. Note that the computer terminal according to this embodiment does not need to include all of the components illustrated in FIG. 1, and some of the components illustrated in FIG. 1 may be omitted.

An input section 160 allows the operator to input information, and outputs the information input by the operator to a processing section. The input section 160 according to this embodiment includes a detection section 162 that detects the information (signal) input by the operator. The input section 160 may include a lever, a button, a steering wheel, a microphone, a touch panel display, or the like.

The input section 160 may be an input device that includes an acceleration sensor that detects triaxial accelerations, a gyrosensor that detects angular velocity, or an imaging section. For example, the input device may be held or worn by the operator. The term "input device" includes a controller that imitates a tool such as a sword-type controller or a gun-type controller that is held by the operator, or a glove-type controller that is worn by the operator. The term "input device" also includes a game device, a portable game device, a portable telephone, and the like that are integrated with the input device.

The input section 160 may be a Japanese drum-type input section. The Japanese drum-type input section includes a tubular body having an approximately cylindrical shape, a drumhead, and a frame, the drumhead and the frame being provided on one end of the tubular body. For example, the Japanese drum-type input section includes a hit sensor (impact sensor) that is provided in each of the drumhead (right drumhead area and left drumhead area) and the frame (right frame area and left frame area), and detects an impact applied by the operator to the drumhead (right drumhead area and left drumhead area) or the frame (right frame area and left frame area), The computer terminal according to this embodiment may include a plurality of input sections. For example, the computer terminal according to this embodiment may include a first input section for a first operator (1P) and a second input section for a second operator (2P).

A storage section 170 serves as a work area for a processing section 100, a communication section 196, and the like. The function of the storage section 170 may be implemented by a RAM (VRAM) or the like.

The storage section 170 includes a main storage section 171 that is used as a work area for the processing section 100, an image buffer 172 in which an image displayed on a display section 190 is drawn, an object data storage section 173 that stores object data (e.g., an instruction mark (note) and a game character), a music data storage section 174, and a musical score data storage section 175.

The object data storage section 173 stores a plurality of instruction marks that differ in color and shape. The term "instruction mark" used herein refers to an object (display object) or an instruction image that instructs the operator to perform an input using the input section. For example, the object data storage section 173 stores a plurality of instruction marks corresponding to identification information. Specifically, the object data storage section 173 stores an orange round instruction mark having a radius of 1 (note A), a light blue round instruction mark having a radius of 1 (note B), and an orange round instruction mark having a radius of 2 (big note A_big).

The music data storage section 174 stores one or more pieces of music data. Specifically, the music data storage section 174 stores music data that has been selected based on the information input by the operator.

The musical score data storage section 175 stores musical score data. The musical score data storage section 175 stores musical score data corresponding to the music data that has been selected by the operator and stored in the music data storage section 174. The musical score data includes a plurality of reference timings that are set in advance according to the music data, identification information about the instruction mark corresponding to each reference timing, and instruction mark display/non-display data that is set in advance corresponding to each reference timing. The reference timing is defined by the elapsed time from the reproduction start time of the music data (e.g., a frame number (at a drawing frame rate) when the music data reproduction start time is "0"). The musical score data storage section 175 further stores a property (an evaluation property or a non-evaluation property) of each of the reference timings.

The identification information about the instruction mark includes information that must be input at the reference timing, and information that identifies a process based on the input information. Examples of the instruction mark (identification information) include an instruction mark A (note A), an instruction mark B (note B), an instruction mark A_big (note A_big), or the like.

An information storage medium 180 is a computer-readable medium that stores a program, data, and the like. The information storage medium 180 may be an optical disk (CD or DVD), a magneto-optical disk (MO), a magnetic disk, a hard disk, a magnetic tape, a memory (ROM), or the like.

The information storage medium 180 stores a program and data that cause the processing section 100 to perform various processes. Specifically, the information storage medium 180 stores a program that causes a computer to function as each section according to this embodiment (i.e., a program that causes a computer to perform the process of each section).

The information storage medium 180 also stores a plurality of pieces of music data and musical score data corresponding to each piece of music data. In this embodiment, digital data encoded by pulse code modulation (PCM) or the like is used as the music data.

The display section 190 outputs an image generated according to this embodiment. The function of the display section 190 may be implemented by a CRT, an LCD, a touch panel display, a head mount display (HMD), or the like. The display section 190 displays a game image including an instruction mark, a game character, and the like.

A sound output section 192 outputs sound that is reproduced by a music reproduction section 112 or sound generated by a sound generation section 130. The function of the sound output section 192 may be implemented by a speaker, a headphone, or the like. When the game has started and the music data has been reproduced, the sound output section 192 outputs the reproduced sound and sound (hit sound) that is produced when the operator operates the input section.

The communication section 196 controls communication with the outside (e.g., another computer terminal or server). The function of the communication section 196 may be implemented by hardware such as a processor or a communication ASIC, a program, or the like.

Note that the computer terminal may receive a program (data) that causes a computer to function as each section according to this embodiment from an information storage medium or a storage section included in a server through a network, and may store the received program (data) in the information storage medium 180 or the storage section 170. A case where the computer terminal (game system) operates based on the program (data) received from the server is also included within the scope of the invention.

The processing section 100 (processor) performs a game process, an image generation process, a sound generation process, and the like based on data output from the input section 160, a program, and the like. The processing section 100 performs various processes using the storage section 170 (main storage section 171) as a work area. The function of the processing section 100 may be implemented by hardware such as a processor (e.g., CPU or DSP) or an integrated circuit (IC) (e.g., ASIC) or a program.

The processing section 100 according to this embodiment includes an object space setting section 111, a music reproduction section 112, a display control section 113, an evaluation section 114, a change section 115, a game calculation section 116, a drawing section 120, and a sound generation section 130. Note that some of these sections may be omitted.

The object space setting section 111 disposes an object formed by a primitive such as a polygon, a free-form surface, or a subdivision surface that represents a display object (e.g., an instruction mark or a character) in an object space (game space).

The term "object space" includes a virtual two-dimensional space and a virtual three-dimensional space. The two-dimensional space is a space in which the object is disposed at two-dimensional coordinates (X, Y), and the three-dimensional space is a space in which the object is disposed at three-dimensional coordinates (X, Y, Z), for example.

When the object space is a two-dimensional space, the object space setting section 111 may dispose a plurality of objects based on the priority set for each object. For example, the priority is set so that a note object is displayed at the front.

When the object space is a three-dimensional space, the object space setting section 111 disposes an object in a world coordinate system. For example, the object space setting section 111 determines the position and the rotational angle of the object in the world coordinate system (the rotational angle is synonymous with orientation or direction; e.g., the rotational angle when the object is rotated clockwise around each of the X, Y, and Z axes in the world coordinate system), and disposes the object at the determined position (X, Y, Z) and the determined rotational angle (rotational angles around the X, Y, and Z axes).

The music reproduction section 112 reproduces the music data stored in the music data storage section 174, and outputs the sound waveform of the music data to the sound output section 192. The function of the music reproduction section 112 may be implemented by hardware such as an integrated circuit (sound source IC) that generates a music data sound waveform based on the music data, a program, or the like.

The display control section 113 displays the instruction mark. The display control section 113 according to this embodiment moves the instruction mark set to a display state (the instruction mark representing a reference timing having the evaluation property) in a predetermined direction at a predetermined moving speed (i.e., movement display control (scroll display control)). For example, the display control section 113 moves the instruction mark every frame along a moving path at the predetermined moving speed. The display control section 113 does not display an instruction mark set to a non-display state (the instruction mark representing a reference timing having the non-evaluation property). When an instruction mark has been set to a display state from a non-display state, the display control section 113 displays the instruction mark that has been set to a display state. In other words, the display control section 113 displays an instruction mark representing a reference timing having the evaluation property and the evaluation property that has been changed from the non-evaluation property. The display control section 113, however, does not display an instruction mark representing a reference timing having the non-evaluation property.

The display control section 113 causes an object to move in the object space or to make a motion (animation) based on information input by the operator using the input section 160, a program (movement/motion algorithm), data (motion data), and the like. Specifically, the display control section 113 sequentially calculates movement information (position, rotational angle, speed, or acceleration) and motion information about the object every frame (e.g., 1/60th of a second). The term "frame" refers to a time unit used for an object movement/motion process or an image generation process.

The display control section 113 according to this embodiment determines the moving speed of the instruction mark based on a difficulty level. For example, when the moving speed when the difficulty level is "Low" is referred to as "v1", the moving speed when the difficulty level is "Medium" is referred to as "v2", and the moving speed when the difficulty level is "High" is referred to as "v3", the display control section 113 determines the moving speed of the instruction mark so that the relationship "0<v1<v2<v3" is satisfied (i.e., the moving speed of the instruction mark increases as the difficulty level increases).

The display control section 113 according to this embodiment moves an instruction mark set to a display state among a plurality of instruction marks corresponding to a plurality of reference timings along the moving path so that the instruction mark is located at a predetermined point at the reference timing corresponding to the instruction mark, without displaying an instruction mark set to a non-display state. In other words, the display control section 113 according to this embodiment moves an instruction mark representing a reference timing having the evaluation property along the moving path toward the predetermined point on the moving path.

The display control section 113 according to this embodiment moves an instruction mark that has been set to a display state from a non-display state radially from around the predetermined point, and then moves the instruction mark along the moving path. In other words, the display control section 113 according to this embodiment moves an instruction mark representing a reference timing having the evaluation property that has been changed from the non-evaluation property radially from around the predetermined point and then along the moving path.

The display control section 113 according to this embodiment moves an instruction mark that has been set to a display state from a non-display state from around the predetermined point to an placement point on the moving path and then moves the instruction mark along the moving path, the placement point corresponding to the instruction mark. In other words, the display control section 113 according to this embodiment moves an instruction mark representing a reference timing having the evaluation property that has been changed from the non-evaluation property from around the predetermined point to a placement point that is on the moving path and corresponds to the instruction mark and then along the moving path.

The display control section 113 according to this embodiment displays an instruction mark that has been set to a display state from a non-display state (an instruction mark representing a reference timing having the evaluation property that has been changed from the non-evaluation property) while differentiating from an instruction mark set to a display state in advance (an instruction mark representing a reference timing previously having the evaluation property). The display control section 113 moves an instruction mark that has been set to a display state from a non-display state from a given point to locate at a predetermined placement point that is on the moving path and corresponds to the instruction mark, and then displays the instruction mark while differentiating from an instruction mark set to a display state in advance. For example, when the display control section 113 moves an instruction mark that has been set to a display state from a non-display state from around the predetermined point to the placement point on the moving path corresponding to the instruction mark, the display control section 113 displays the instruction mark without differentiating from an instruction mark set to a display state in advance until the instruction mark is moved to the placement point, and then displays the instruction mark while differentiating from the instruction mark set to a display state in advance after the instruction mark has been located at the placement point. In this embodiment, the display control section 113 displays an instruction mark that has been set to a display state from a non-display state while differentiating from an instruction mark set to a display state in advance, by superimposing an identification mark on the instruction mark that has been set to a display state from a non-display state.

The evaluation section 114 compares the reference timing corresponding to the instruction mark set to a display state with the input timing of the operator to evaluate the input performed by the operator. In other words, the evaluation section 114 conducts an evaluation of the operator's input by comparing the reference timing having the evaluation property with a timing of the input performed by the operator. Specifically, the evaluation section 114 determines the degree of coincidence (difference) between the input timing when the operator has operated the input section 160 and the reference timing based on the reproduction start time of the music data stored in the musical score data storage section 175, and evaluates the input performed by the operator based on the determination result. The evaluation section 114 according to this embodiment evaluates the degree of coincidence between the input timing and the reference timing as "Great", "Good", or "Miss".

The change section 115 sets an instruction mark in a non-display state to a display state when a predetermined condition is satisfied. Specifically, the change section 115 sets an instruction mark in a non-display state to a display state based on the evaluation result for the operator's input, the evaluation being performed by comparing the reference timing corresponding to a specific instruction mark (e.g., big note A_big) with the input timing of the operator. For example, the change section 115 sets one or more instruction marks in a non-display state to a display state when the evaluation result for the operator's input that is performed by comparing the reference timing corresponding to the specific instruction mark with the input timing of the operator is "Great" or "Good".

In other words, the change section 115 changes the non-evaluation property of a reference timing to the evaluation property based on a result of the evaluation conducted by comparing a reference timing having the evaluation property with the timing of the input performed by the operator. For example, the change section 115 changes the non-evaluation property of one or more reference timings to the evaluation property when a result of the evaluation conducted by comparing a reference timing having the evaluation property with the timing of the input performed by the operator is "Great" or "Good".

The change section 115 sets an instruction mark that is set to a non-display state and corresponds to a reference timing within a predetermined period to a display state. The predetermined period may be a period from the reference timing corresponding to the specific instruction mark to a musical score branch timing, or a period from an Nth measure to an (N+7)th measure (where Nth measure is a measure that includes the reference timing corresponding to the specific instruction mark), for example.

In other words, the change section 115 changes the non-evaluation property of a reference timing within a predetermined period to the evaluation property. For example, the change section 115 changes the non-evaluation property of a reference timing within a predetermined period after a reference timing having the evaluation property to the evaluation property.

The change section 115 sets an instruction mark that has been set to a non-display state in advance based on the evaluation result for the operator's input that is performed by comparing the reference timing corresponding to the specific instruction mark with the input timing of the operator to a display state. For example, the change section 115 differentiates an instruction mark that is set from a non-display state to a display state when the evaluation result for the operator's input that is performed by comparing the reference timing corresponding to the specific instruction mark with the input timing of the operator is "Great" from an instruction mark that is set from a non-display state to a display state when the evaluation result for the operator's input that is performed by comparing the reference timing corresponding to the specific instruction mark with the input timing of the operator is "Good".

In other words, the change section 115 may change the non-evaluation property of a predetermined reference timing to the evaluation property based on a result of the evaluation for the input performed by the operator. For example, the change section 115 may differentiate a reference timing having the non-evaluation property that is changed to the evaluation property when an evaluation result for the operator's input that is conducted by comparing a reference timing having the evaluation property with the input timing of the operator is "Great" from a reference timing having the non-evaluation property that is changed to the evaluation property when the evaluation result is "Good".

The game calculation section 116 starts or finishes the game, calculates the score in the game, and calculates the game result, for example.

For example, the game calculation section 116 according to this embodiment receives selection of music data based on information input by the operator, loads the selected music data from the information storage medium 180 into the music data storage section 174, and loads the musical score data corresponding to the selected music data from the information storage medium 180 into the musical score data storage section 175.

The game calculation section 116 according to this embodiment adds points corresponding to the evaluation result of the evaluation section 114 (e.g., 10 points when the evaluation result is "Great", 5 points when the evaluation result is "Good", and 0 points when the evaluation result is "Miss") to a score X. The game calculation section 116 determines whether or not a value indicated by a score gauge (overall evaluation value) G that indicates the score X by 0 to 100% is equal to or larger than a predetermined value after the music reproduction section 112 has reproduced the entire music data.

The drawing section 120 draws (generates) an image based on various processes (game process) performed by the processing section 100, and outputs the drawn image to the display section 190. The function of the drawing section 120 may be implemented by hardware such as a drawing processor (GPU), a program, or the like. The image drawn by the drawing section 120 may be a two-dimensional image or a three-dimensional image. Specifically, the drawing section 120 draws an object in the image buffer 172 (i.e., a buffer such as a frame buffer or an intermediate buffer; VRAM). The drawing section 120 updates image information every frame (e.g., 1/60th of a second). The drawing section 120 draws an image including the instruction mark stored in the object data storage section 173 in the image buffer 172 in synchronization with the music data reproduced by the music reproduction section 112.

The sound generation section 130 generates an effect sound and a game sound based on the calculation result of the game calculation section 116.

2. Outline

The computer terminal according to this embodiment allows the operator (player) to give a performance to the rhythm indicated by the music data by virtually striking a percussion instrument (e.g., drum) at the reference timing indicated by the music data.

Figure 2:
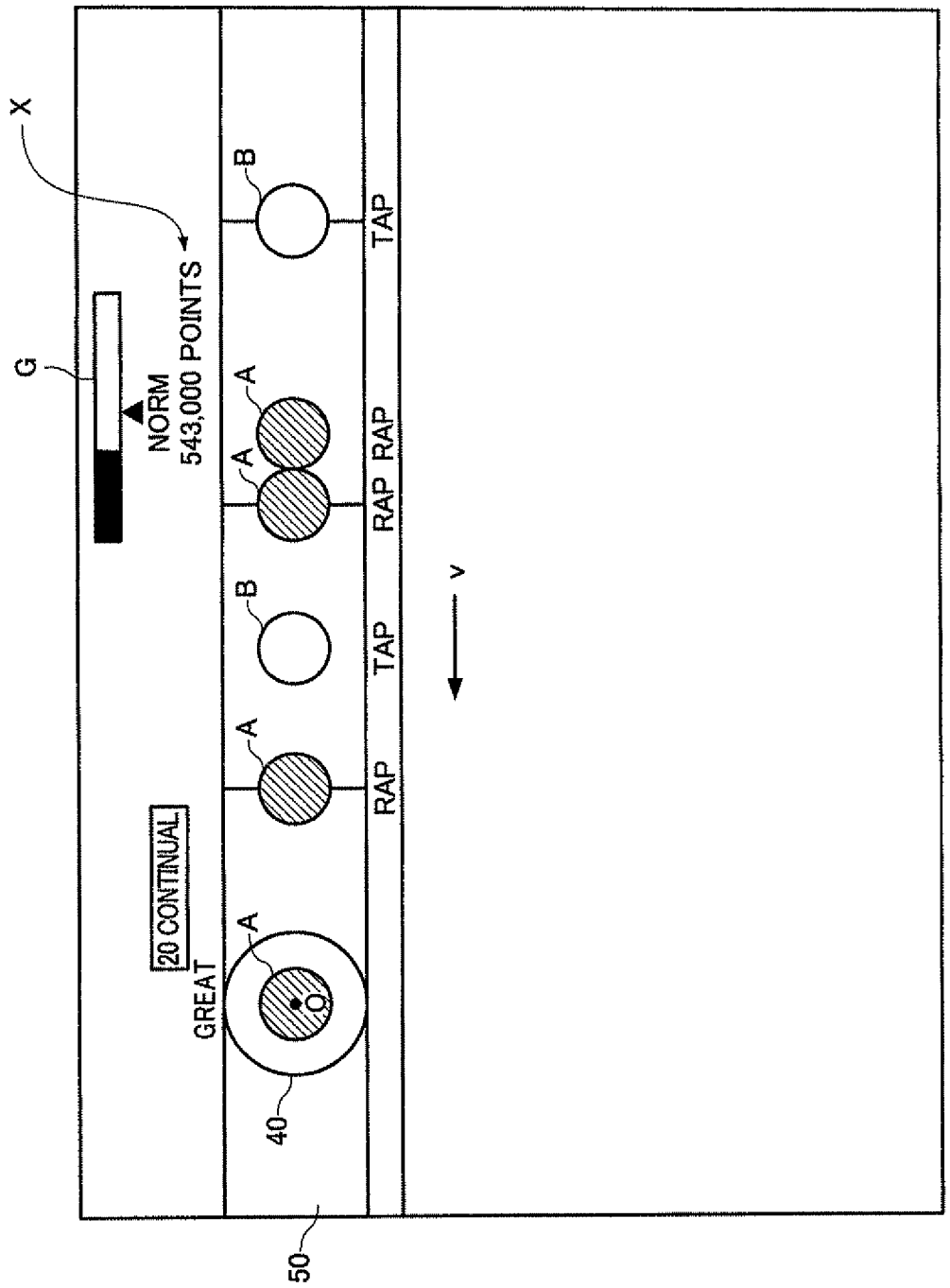
FIG. 2 illustrates an example of an image displayed on a display section according to one embodiment of the invention.

FIG. 2 illustrates an example of an image displayed on the display section 190. In this embodiment, the computer terminal receives selection of one piece of music data from a plurality of pieces of music data based on information input by the operator, and reproduces the selected music data. The computer terminal moves a note (i.e., instruction mark) corresponding to each reference timing in a game space along a moving path 50 in synchronization with reproduction of the music data, and compares the reference timing at which the note is located at a predetermined point (a predetermined fixed point) O with the input timing of the operator to evaluate the input performed by the operator. In other words, in this embodiment, a storage section stores a plurality of reference timings having an evaluation property or a non-evaluation property for the music data, and an input performed by an operator is evaluated by comparing a reference timing having the evaluation property and a timing of the input performed by the operator.

Specifically, the computer terminal moves each note (e.g., notes A and B) at a predetermined moving speed v along the moving path 50 so that each note reaches the predetermined point O at the reference timing corresponding to each note, and determines the degree of coincidence (difference) between the input timing of the operator and the reference timing (the reference timing having the evaluation property) to evaluate the input performed by the operator. In this embodiment, a round determination frame 40 that is positioned around the predetermined point O is displayed so that the operator can visually determine the reference timing corresponding to each note. This makes it possible for the operator to visually determine the reference timing based on the degree of overlap between the note and the determination frame 40.

Figure 3:
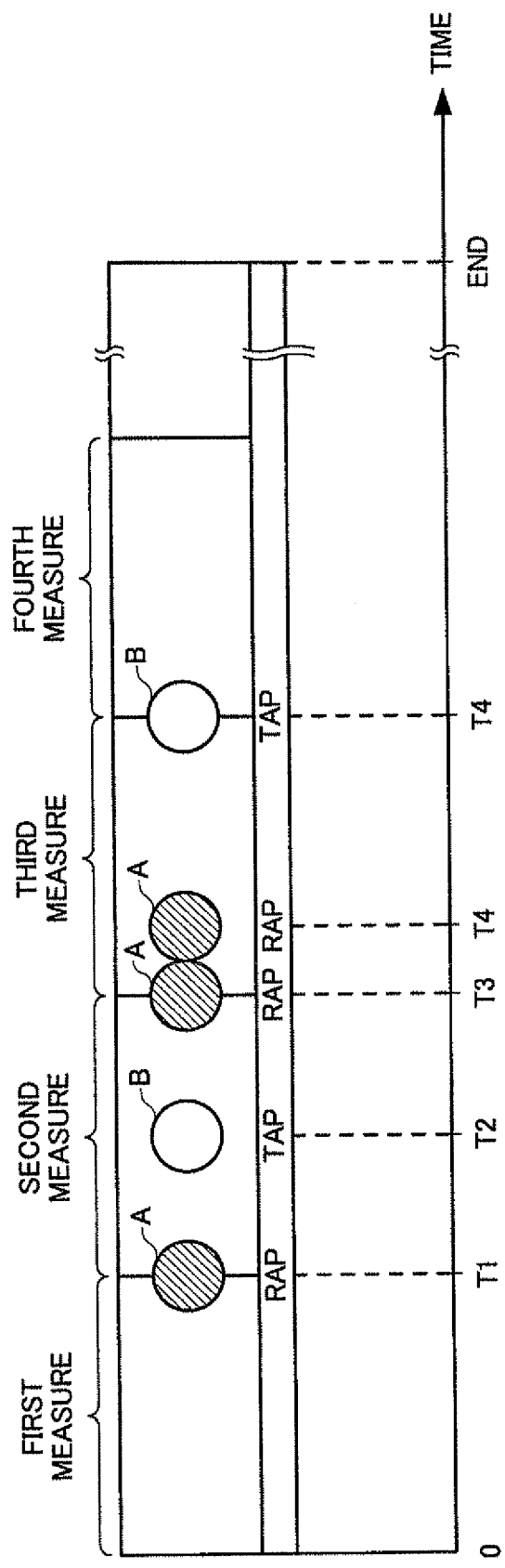
FIG. 3 is a conceptual diagram illustrating musical score data according to one embodiment of the invention.

FIG. 3 is a conceptual diagram illustrating the musical score data. The musical score data storage section 175 stores a plurality of reference timings that are set in advance corresponding to the music data, identification information about the instruction mark corresponding to each reference timing, and display state/non-display state setting information. The musical score data storage section 175 also stores the property of each of the plurality of reference timings (the evaluation property or the non-evaluation property).

The reference timing is defined by the elapsed time from the music data reproduction start time corresponding to the drawing frame rate (e.g., 60 frames per second (fps)). For example, the reference timing is defined by the frame number when the music data reproduction start time is "0".

The musical score data includes (stores) the identification information about the note associated with each reference timing. For example, the identification information about the note refers to a note A, a note B, a note A_big, and the like. Each reference timing is associated with a piece of the identification information and stored in the musical score data storage section 175. For example, a reference timing T1 is associated with the note A and stored, and a reference timing T2 is associated with the note B and stored. The musical score data also includes (stores) the number of measures of the music data, the musical score branch timing, and the end timing of each measure of the music data.

A display state or a non-display state of the note associated with each reference timing is set as the musical score data. The term "non-display state" used herein means that the note is not displayed when the instruction mark is located at the predetermined point O. Therefore, an instruction mark that has not been displayed on the display section but is displayed on the display section when the reference timing is reached is set to the display state. Specifically, an instruction mark that is displayed when the instruction mark is located at the predetermined point O at the reference timing is set to the display state. On the other hand, an instruction mark that is not displayed even when the reference timing is reached (i.e., an instruction mark that is not displayed when the instruction mark is located at the predetermined point O at the reference timing) is set to the non-display state.

In this embodiment, a note that is set to the display state is displayed on the display section. Each note differs in shape and color depending on the input instruction for the operator. For example, an orange round image (object) is displayed as the note A when instructing the operator to perform in an input A (e.g., an input using a drumhead), and a light blue round image (object) is displayed as the note B when instructing the operator to perform an input B (e.g., an input using a frame). A syllable ("RAP" corresponding to the note A, or "TAP" corresponding the note B) corresponding to each note is displayed under each note, and is moved together with the corresponding note at the same moving speed.

Figure 4:
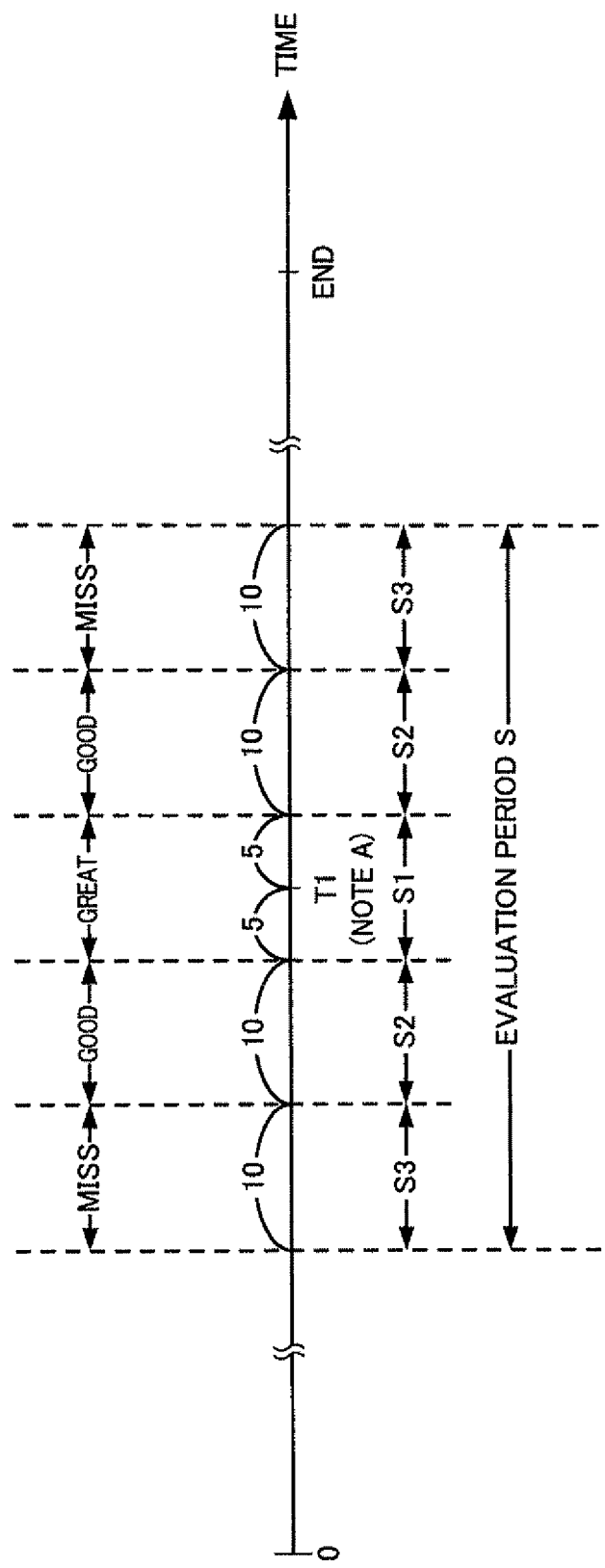
FIG. 4 is a diagram for describing an evaluation process according to one embodiment of the invention.

FIG. 4 is a diagram for describing a method of evaluating an input performed by the operator. In this embodiment, the computer terminal evaluates an input performed by the operator based on the reference timing corresponding to the instruction mark set to the display state and an evaluation timing. Specifically, the computer terminal evaluates an input performed by the operator based on the instruction mark set to the display state, and does not evaluate an input performed by the operator based on the instruction mark set to the non-display state. In other words, in this embodiment, a reference timing having the evaluation property is evaluated, and a reference timing having the non-evaluation property is not evaluated.

The evaluation process according to this embodiment is described in detail below. Specifically, an evaluation period S is provided corresponding to each reference timing. The reference timings and the evaluation periods S are set in advance so that the evaluation periods S do not overlap. The evaluation period S is divided into periods S1 to S3 corresponding to three evaluation levels. The computer terminal determines a period that includes the input timing of the operator from the periods S1 to S3, and evaluates the input performed by the operator based on the determination result. For example, the computer terminal acquires the input timing of the operator, and determines a period that includes the input timing of the operator from the periods S1 to S3.

The details of the periods S1 to S3 are described below. As illustrated in FIG. 4, the period S1 is a period that includes the reference timing T1. For example, the period S1 is set to be a period that covers five frames preceding the reference timing T1 and five frames subsequent to the reference timing T1. The period S2 is a period that is close to the reference timing T1. For example, the period S2 is set to be a period that covers 15 frames preceding the reference timing T1 and 15 frames subsequent to the reference timing T1, and excludes the period S1 (i.e., a period that covers five frames preceding the reference timing T1 and five frames subsequent to the reference timing T1). The period S3 is a period that is away from the reference timing T1. For example, the period S3 is set to be a period within the evaluation period S other than the periods S1 and S2.

For example, when the note A is stored corresponding to the reference timing T1, the computer terminal evaluates the input performed by the operator corresponding to the reference timing T1 as "Great" when the computer terminal has acquired the input timing of the operator within the period S1. The computer terminal evaluates the input performed by the operator corresponding to the reference timing T1 as "Good" when the computer terminal has acquired the input timing of the operator within the period S2. The computer terminal evaluates the input performed by the operator corresponding to the reference timing T1 as "Miss" when the computer terminal has acquired the input timing of the operator within the period S3.

In this embodiment, the computer terminal displays the evaluation result for the input timing of the operator with respect to the reference timing over (or below) the determination frame 40 ("Great" illustrated in FIG. 2), for example.

In this embodiment, the computer terminal evaluates the input performed by the operator when the received input information corresponds to the identification information about the instructed note.

For example, when the note A is stored corresponding to the reference timing T1 and the information input by the operator is input information A corresponding to the identification information about the note A, the computer terminal compares the input timing when the input information A has been acquired with the reference timing T1. When the information input by the operator is not the input information A corresponding to the identification information about the note A (e.g., input information B corresponding to the identification information about the note B), the computer terminal does not compare the acquired input timing with the reference timing T1 (i.e., does not evaluate the input performed by the operator). In this embodiment, the computer terminal does not evaluate the input performed by the operator when the input timing of the operator has been acquired in a period other than the evaluation period S.

In this embodiment, the computer terminal adds points corresponding to the evaluation result for the input performed by the operator to the score X. For example, when the evaluation result for the input performed by the operator is "Great", the computer terminal adds points corresponding to the evaluation result "Great" to the score X. When the evaluation result for the input performed by the operator is "Good", the computer terminal adds points corresponding to the evaluation result "Good" to the score X. Specifically, when the evaluation result for the input performed by the operator is "Great" or "Good", the computer terminal adds points corresponding to the evaluation result to the score X. In this embodiment, the computer terminal displays the score gauge G that indicates the score X by 0 to 100% on the display section.

In this embodiment, when the inputs performed by the operator are successively evaluated as "Great" or "Good", the computer terminal displays a continual number (combo number) on the display section, and adds points corresponding to the continual number (e.g., 100 points when the continual number is 10) to the score X. Specifically, when the inputs performed by the operator corresponding to the notes that sequentially reach the predetermined point O are evaluated as "Great" or "Good", the operator can score high points.

In this embodiment, the computer terminal displays the score X and the score gauge G on the display section when reproduction of the music data has completed. The computer terminal then determines whether or not the value indicated by the score gauge G corresponding to the music data has exceeded a predetermined value (clear value, norm value, or threshold value), and displays the determination result on the display section. For example, when the value indicated by the score gauge G has exceeded the predetermined value, the computer terminal receives selection of the subsequent music data, reproduces the subsequent music data, and evaluate an input performed by the operator. When the value indicated by the score gauge G is equal to or less than the predetermined value, the computer terminal finishes the game.

3. Change Process

In this embodiment, the computer terminal sets a note (an instruction mark) to the display state from the non-display state based on the evaluation result for the input performed by the operator according to the big note A_big (i.e., specific instruction mark). In other words, the non-evaluation property of a reference timing is changed to the evaluation property based on the evaluation result of the operator's input conducted by comparing a reference timing having the evaluation result with the input timing of the operator. Specifically, the computer terminal displays the big note A_big, and evaluates the input performed by the operator according to the big note A_big based on the reference timing for the big note A_big and the input timing of the operator. When the evaluation result for the input performed by the operator according to the big note A_big is "Great" or "Good", the computer terminal sets some or all of a plurality of notes A set to the non-display state in advance to the display state from the non-display state. Specifically, the note A set to the non-display state suddenly appears when the evaluation result for the input performed by the operator according to the big note A_big is "Great" or "Good", so that the operator can score high points.

Specifically, each note is set to the display state or the non-display state in advance according to the music data, and the input performed by the operator according to the note set to the display state is evaluated. Each note set to the non-display state is set to the display state from the non-display state on condition that the evaluation result for the input performed by the operator according to the big note A_big is "Great" or "Good".

Figure 5:
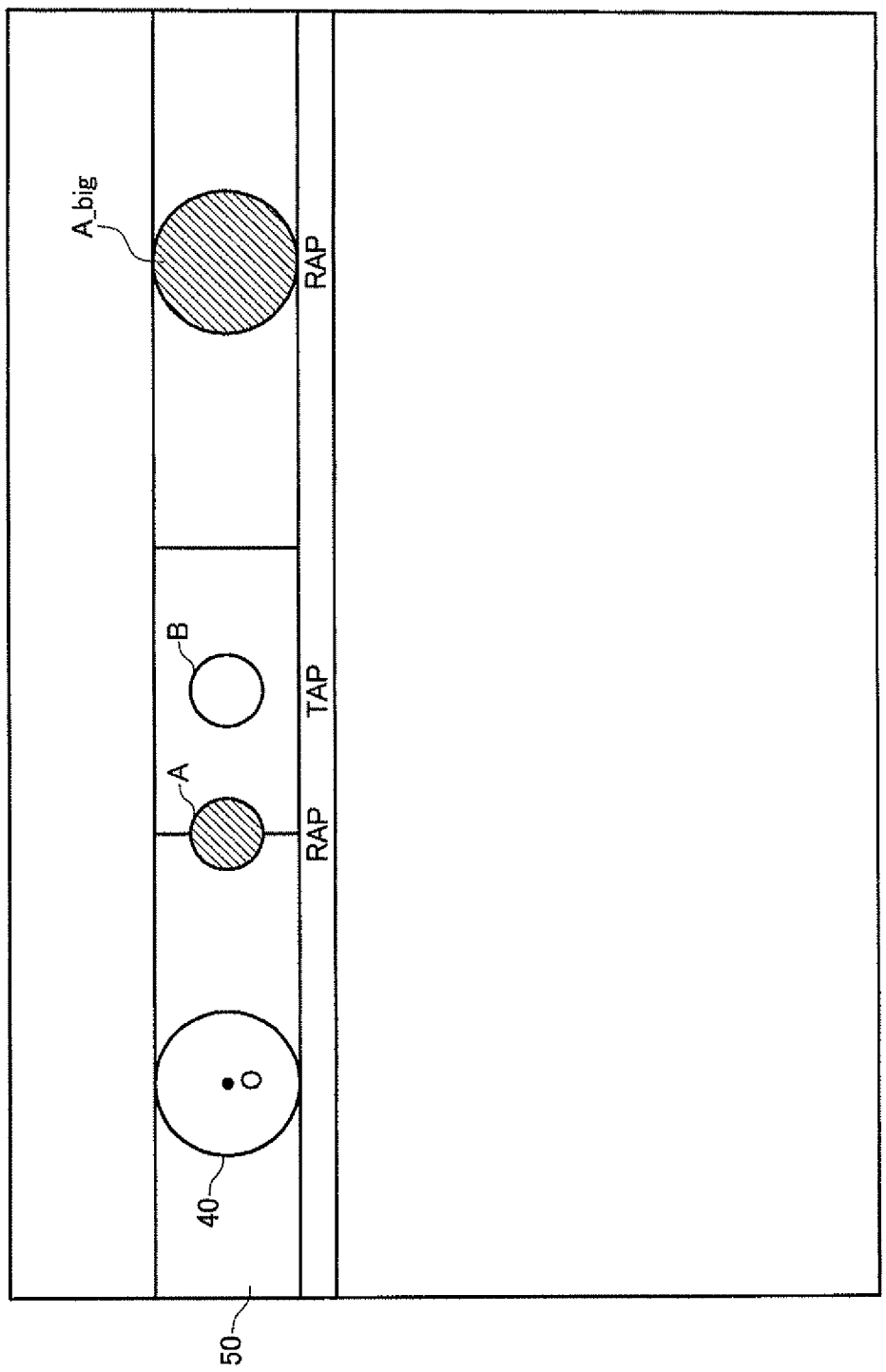
FIG. 5 illustrates an example of an image including a big note that is displayed on a display section according to one embodiment of the invention.

FIG. 5 illustrates an example of an image including the big note A_big. As illustrated in FIG. 5, the computer terminal displays the round big note A_big that is larger than the note A, and moves the big note A_big along the moving path 50 toward the predetermined point O (determination frame 40) in the same manner as the note A.

In this embodiment, the computer terminal sets some or all of the notes set to the non-display state to the display state within a predetermined period after the reference timing for the big note A_big has been reached on condition that the evaluation result for the input performed by the operator according to the big note A_big is "Great" or "Good", and evaluates the operator's input according to each note that has been set from non-display state to the display state. Specifically, a plurality of reference timings including a plurality of non-evaluation target reference timings (having the non-evaluation property) and a plurality of evaluation target reference timings (having the evaluation property) are set as the musical score data in advance, and some or all of the non-evaluation target reference timings are set to the evaluation target when the evaluation result for the input performed by the operator according to the big note A_big is "Great" or "Good". In other words, a plurality of reference timings including a plurality of non-evaluation target reference timings (having the non-evaluation property) and a plurality of evaluation target reference timings (having the evaluation property) are set as the musical score data in advance, and some or all of the non-evaluation target reference timings are changed to the evaluation target when the evaluation result for the input performed by the operator according to the big note A_big is "Great" or "Good". That is to say, in this embodiment, the non-evaluation property of a reference timing is changed to the evaluation property on condition that the evaluation result of the operator's input conducted by comparing a specific reference timing having the evaluation property (the reference timing for the big note A_big) with the timing of the input by the operator is "Great" or "Good".

In this embodiment, the computer terminal adds points according to the evaluation result for the input performed by the operator according to the big note A_big to the score X, and also adds points according to the evaluation result for the input performed by the operator according to the note A that has been set to the display state from the non-display state to the score X. The big note A_big and the note A that has been set to the display state from the non-display state are included in the continual target. Specifically, all of the notes displayed on the display section are included in the continual target and the score X addition target. In this embodiment, when the evaluation result for the input performed by the operator according to the big note A_big is "Great" or "Good" and the evaluation result for the input performed by the operator according to each note that has been set to the display state from the non-display state is "Great" or "Good", bonus points (e.g., 100 points) may be added to the score X.

When the evaluation result for the input performed by the operator according to the big note A_big is "Miss" or has not been obtained, the note set to the non-display state is not set to the display state after the reference timing corresponding to the big note A_big has been reached, and the input performed by the operator according to only the note set to the display state is evaluated. In other words, the non-evaluation property of a reference timing is not changed to the evaluation property when the evaluation result of the operator's input conducted by comparing a reference timing having the evaluation property with the input timing of the operator is "Miss" or when no evaluation result is obtained.

In this embodiment, since the number of notes displayed increases when the evaluation result for the input performed by the operator according to the big note A_big is "Great" or "Good", the operator can score high points according to the number of notes that have been set to the display state from the non-display state.

The musical score data that includes the reference timing corresponding to the non-display target note and is stored in the musical score data storage section 175 is described below. In this embodiment, the note that is set to the display state from the non-display state when the evaluation result for the input performed by the operator according to the big note A_big is "Great" and the reference timing corresponding to the note, and the note that is set to the display state from the non-display state when the evaluation result for the input performed by the operator according to the big note A_big is "Good" and the reference timing corresponding to the note are distinguishably stored as the musical score data.

FIG. 6A is a table illustrating examples of the notes that are set to the display state from the non-display state when the evaluation result for the operator's input according to the big note A_big is "Great". Specifically, FIG. 6A illustrates examples of reference timings having the non-evaluation property that is changed to the evaluation property (previously having the non-evaluation property) when the evaluation result of the operator's input is "Great".

FIG. 6B is a table illustrating examples of the notes that are set to the display state from the non-display state when the evaluation result for the operator's input according to the big note A_big is "Good". Specifically, FIG. 6B illustrates examples of reference timings having the non-evaluation property that is changed to the evaluation property (previously having the non-evaluation property) when the evaluation result of the operator's input is "Good".

Figure 7:
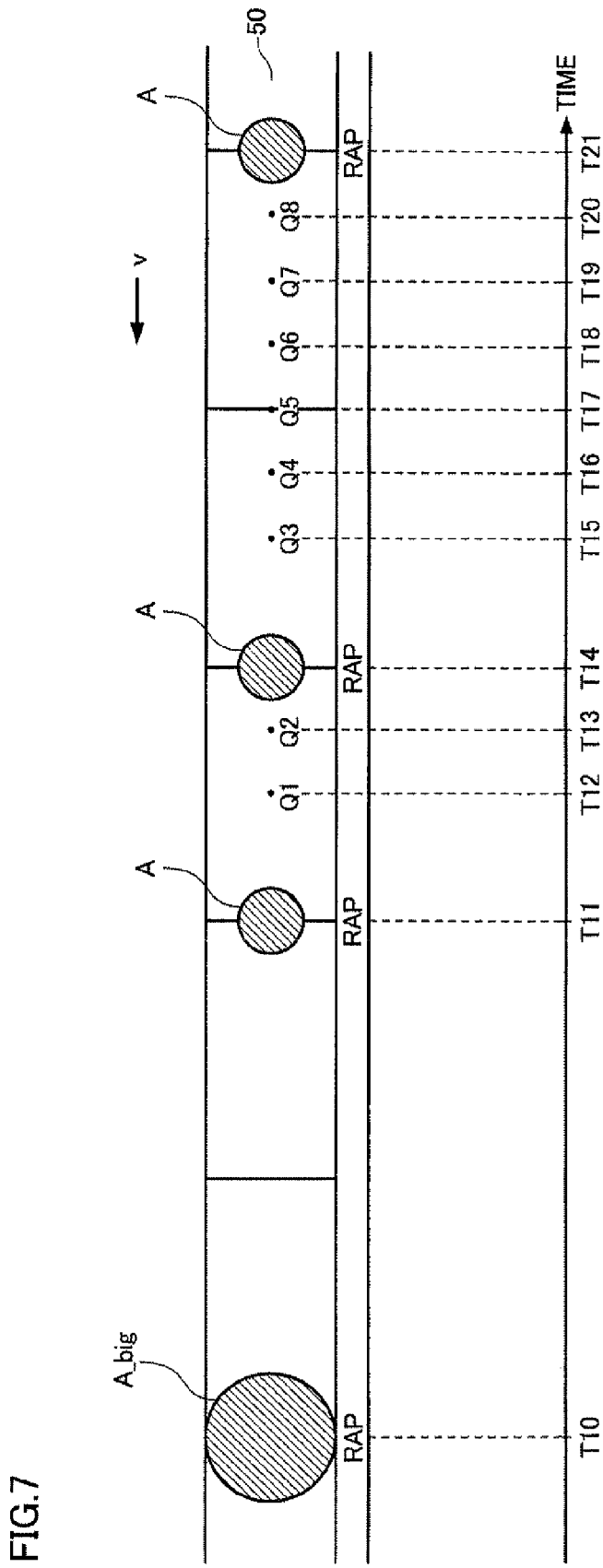
FIG. 7 is a conceptual diagram illustrating musical score data.

As illustrated in FIG. 7, the computer terminal extracts the note set to the non-display state based on the evaluation result for the input performed by the operator according to the big note A_big within a predetermined period (e.g., seven measures) after a reference timing T10 corresponding to the big note A_big, and determines the extracted note to be a note that is set to the display state from the non-display state.

Specifically, the computer terminal extracts the note set to the non-display state from the notes illustrated in FIG. 6A that are set to the display state from the non-display state within a predetermined period after the reference timing T10 when the evaluation result for the input performed by the operator according to the big note A_big is "Great". When the notes A1, A2, A3, A4, A5, A6, A7, and A8 have been extracted, the computer terminal sets the notes A1, A2, A3, A4, A5, A6, A7, and A8 to the display state from the non-display state. Specifically, the computer terminal sets the notes corresponding to reference timings T12, T13, T15, T16, T17, T18, T19, and T20 to the display state from the non-display state, as illustrated in FIG. 7. In other words, the non-evaluation property of the reference timings T12, T13, T15, T16, T17, T18, T19, and T20 is changed to the evaluation property. In this embodiment, placement points Q1 to Q8 of the notes set to the display state from the non-display state on the moving path are determined in advance according to the note moving speed v. Specifically, the notes A1 to A8 set to the non-display state are set to the display state (i.e., displayed) at the placement points Q1 to Q8, respectively.

The computer terminal extracts the note set to the non-display state from the notes illustrated in FIG. 6B that are set to the display state from the non-display state within a predetermined period after the reference timing T10 when the evaluation result for the input performed by the operator according to the big note A_big is "Good".

When the notes A1, A3, A5, and A7 have been extracted, the computer terminal sets the notes A1, A3, A5, and A7 to the display state from the non-display state. In other words, the non-evaluation property of the reference timings T12, T15, T17, and T19 is changed to the evaluation property, for example.

Specifically, since the number of notes to be displayed increases as the evaluation result for the input performed by the operator according to the big note A_big is improved, the operator can score high points. According to this embodiment, the operator is motivated to obtain an evaluation result "Great" for the big note A_big.

In this embodiment, a note that is set to the display state from the non-display state may be determined in advance in association with the type of the big note. For example, the note A may be set to the display state from the non-display state when the evaluation result for the input performed by the operator according to the big note A_big is "Great" or "Good", and the note B may be set to the display state from the non-display state when the evaluation result for the input performed by the operator according to the big note B_big is "Great" or "Good".

Figure 8:
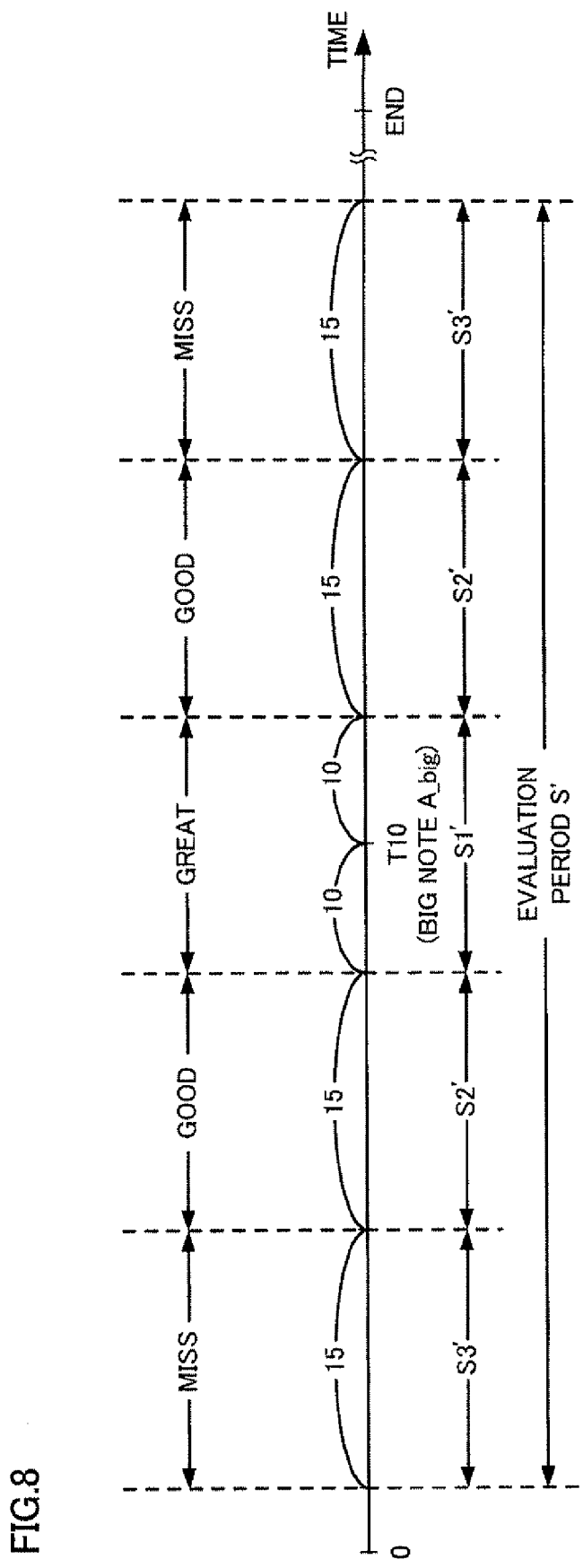
FIG. 8 is a diagram for describing an evaluation process of an input according to a big note.

A method of evaluating the input performed by the operator according to the big note A_big is described below. FIG. 8 is a diagram for describing the method of evaluating the operator's input according to the big note A_big.

In this embodiment, an evaluation period S' is provided for the reference timing corresponding to the big note A_big, and is divided into periods S1' to S3' corresponding to three evaluation levels. The computer terminal determines a period that includes the input timing of the operator from the periods S1' to S3', and evaluates the input performed by the operator based on the determination result.

In this embodiment, the period S1' for which the input performed by the operator according to the big note A_big is evaluated as "Great" is set to be longer than the period S1 for which the input performed by the operator according to the note A or B is evaluated as "Great" (i.e., S1<S1'), and the period S2' for which the input performed by the operator according to the big note A_big is evaluated as "Good" is set to be longer than the period S2 for which the input performed by the operator according to the note A or B is evaluated as "Good" (i.e., S2<S2'), so that the operator can score high points.

As illustrated in FIG. 8, the period S1' is set to be a period that covers 10 frames preceding the reference timing T10 and 10 frames subsequent to the reference timing T10, for example. The period S2' is set to be a period that covers 25 frames preceding the reference timing T10 and 25 frames subsequent to the reference timing T10 and excludes the period S1' (i.e., a period that covers 10 frames preceding the reference timing T10 and 10 frames subsequent to the reference timing T10). The period S3' is a period that is away from the reference timing T10. For example, the period S3' is set to be a period within the evaluation period S' other than the periods S1' and S2'.

4. Display Control

In this embodiment, the computer terminal performs display control that notifies the operator that the note has been set to the display state from the non-display state when the evaluation result for the input performed by the operator according to the big note A_big is "Great" or "Good". For example, the computer terminal disposes each note (instruction mark that instructs the reference timing that is changed the non-evaluation property to the evaluation property) that is set to the display state from the non-display state around the predetermined point O, radially moves each note around the predetermined point O, and then moves each note to the placement point.

Figure 9A:
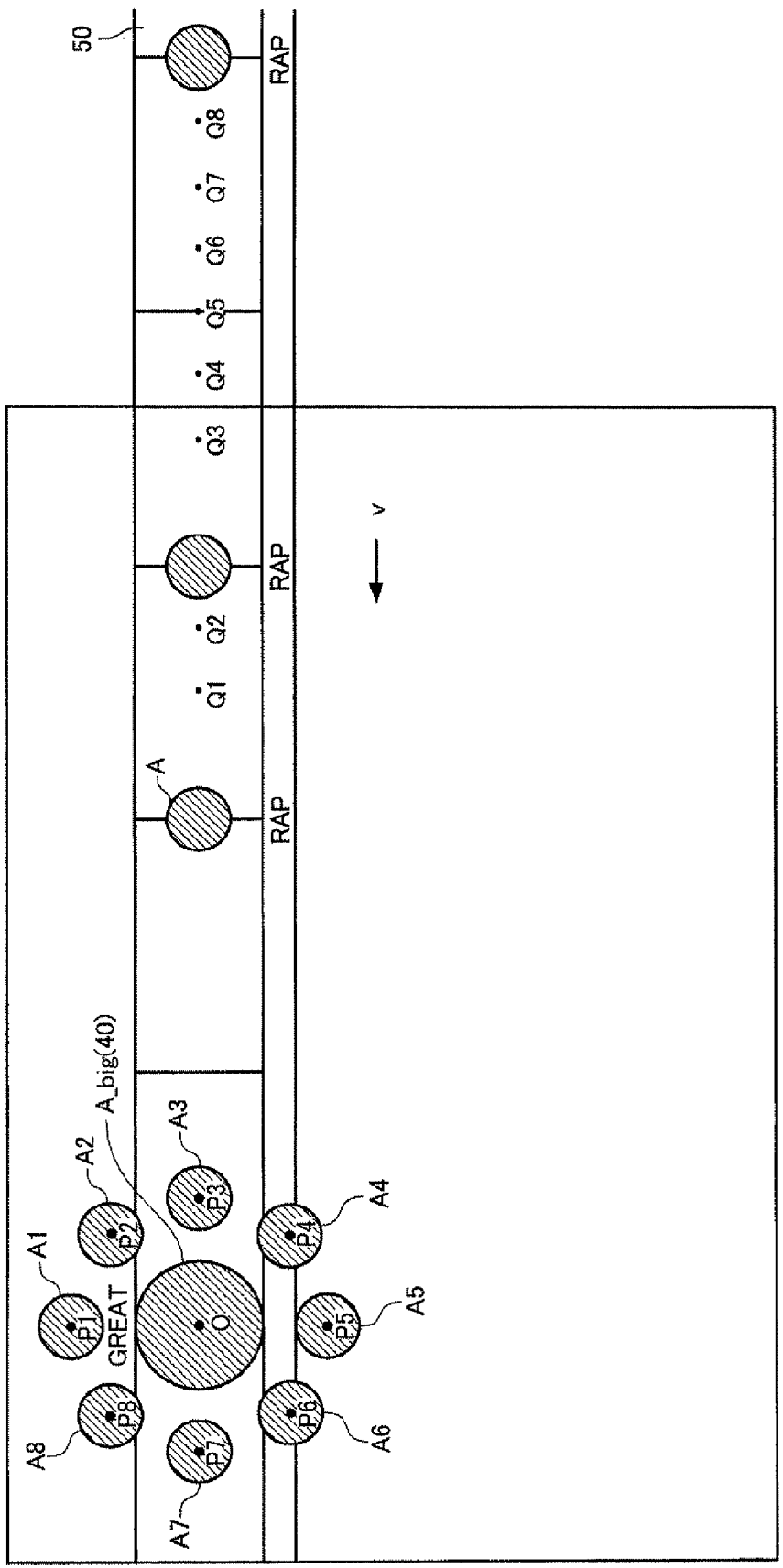
FIGS. 9A to 9C are diagrams for describing note movement control according to one embodiment of the invention.
Figure 9B:
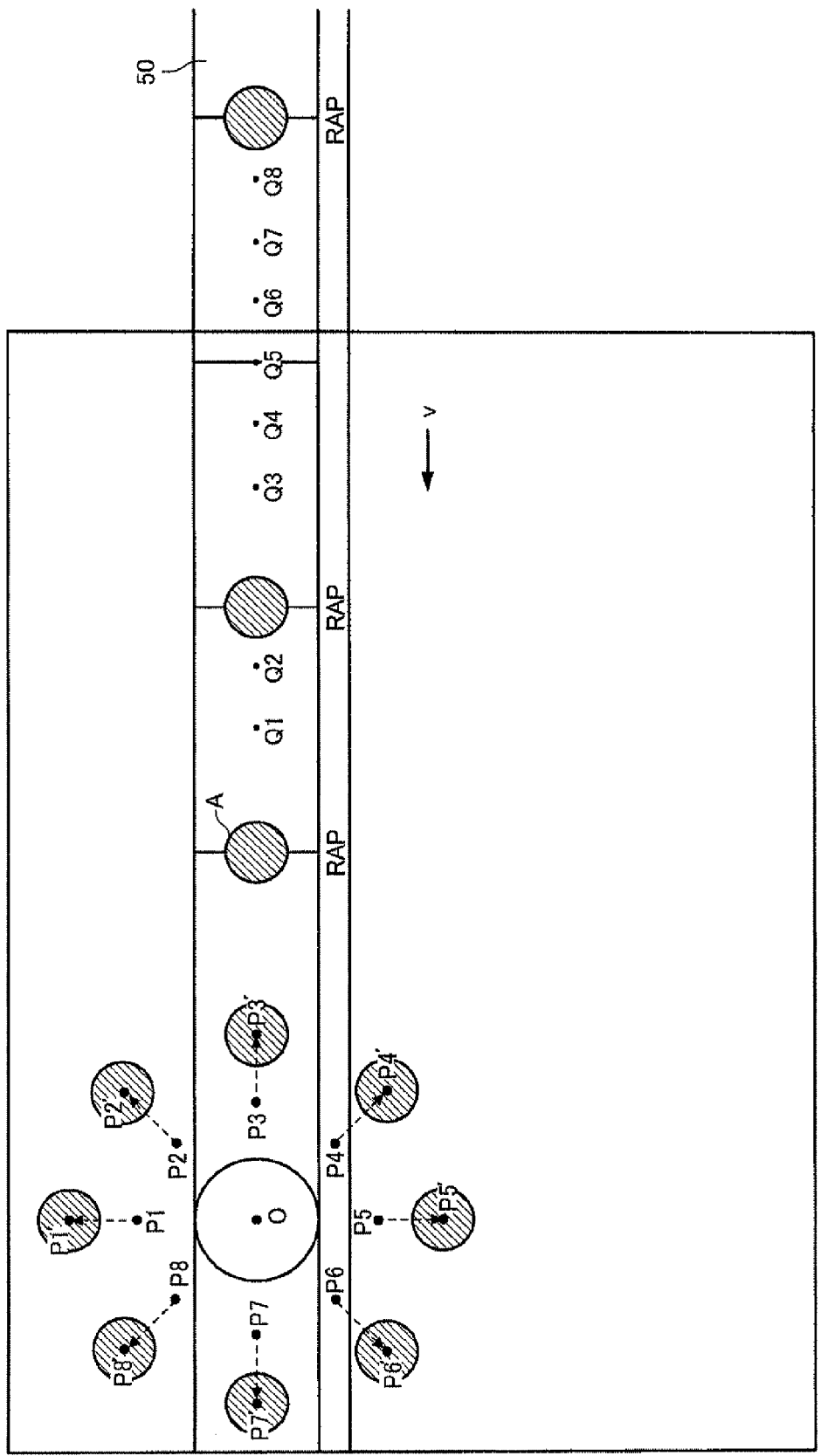

FIG. 9A illustrates an example of an image displayed when the operator's input according to the big note A_big is evaluated as "Great". As illustrated in FIG. 9A, the computer terminal disposes the notes A1 to A8 that are set to the display state from the non-display state at positions P1 to P8 on a circle around the predetermined point O, for example. The computer terminal then radially moves the notes A1 to A8 around the predetermined point O. FIG. 9B illustrates an example of an image displayed when several frames have elapsed from the state illustrated in FIG. 9A. For example, the computer terminal moves the notes A1 to A8 from the positions P1 to P8 to positions P1' to P8', respectively. A situation in which the big note A_big breaks and is divided into the notes A1 to A8 can be displayed by radially moving the notes A1 to A8.

Figure 9C:
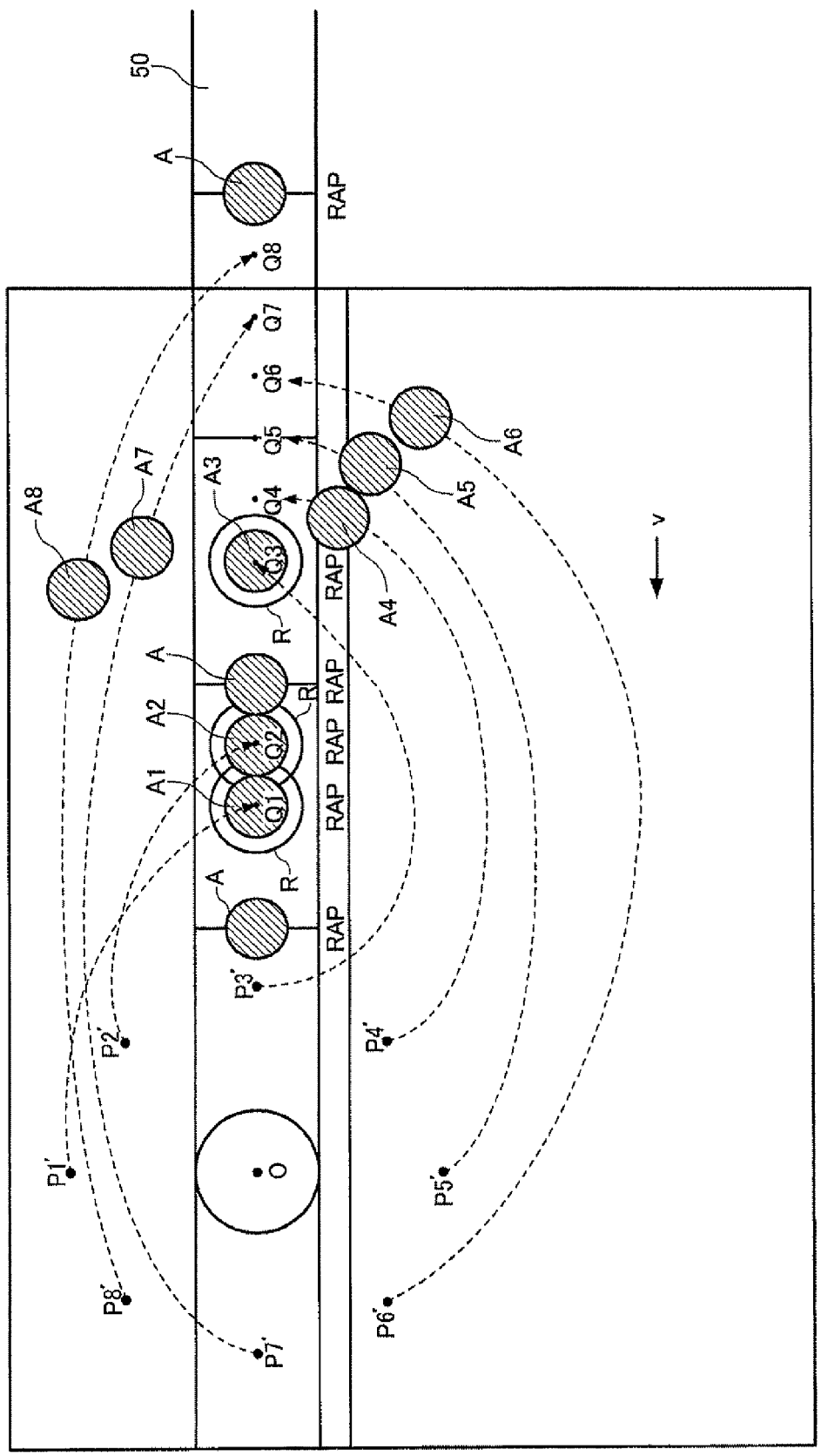

FIG. 9C illustrates an example of an image displayed when several frames have elapsed from the state illustrated in FIG. 9B. In this embodiment, the computer terminal moves the notes A1 to A8 that have been radially moved, to the placement points Q1 to Q8 on the moving path 50 determined in advance. Specifically, the computer terminal moves the note A1 from the position P1' to the position Q1 on the moving path.

In this embodiment, since each note is moved along the moving path 50 at the predetermined moving speed v so that each note reaches the predetermined point O at the reference timing corresponding to each note, it is necessary to dispose the notes A1 to A8 set to the display state from the non-display state at the placement points Q1 to Q8 at least before the notes A1 to A8 reach the predetermined point O. Therefore, it is desirable to calculate moving speeds k1 to k8 of the notes A1 to A8 based on the moving speed v, and move the notes A1 to A8 at the moving speeds k1 to k8.

In this embodiment, when the notes A1 to A8 set to the display state from the non-display state have been disposed at the placement points Q1 to Q8 on the moving path 50, the computer terminal superimposes an identification mark R on each of the notes A1 to A8 in order to differentiate the notes A1 to A8 from the note (note A or B) set to the display state in advance and the like.

In the example illustrated in FIG. 9C, when the notes A1, A2, and A3 have been respectively disposed at the placement points Q1 to Q3 on the moving path, the computer terminal superimposes a ring-shaped identification mark R on each of the notes A1, A2, and A3. This makes it possible for the operator to easily determine the note that has been set to the display state from the non-display state.

In this embodiment, some or all of the notes A1 to A8 may be disposed around the predetermined point O and radially moved using dummy notes. For example, the dummy notes may be deleted after radially moving the dummy notes, and the notes A1 to A8 may then be displayed at the placement points on the moving path while superimposing the identification mark R on each of the notes A1 to A8.

5. Flowchart

Figure 10:
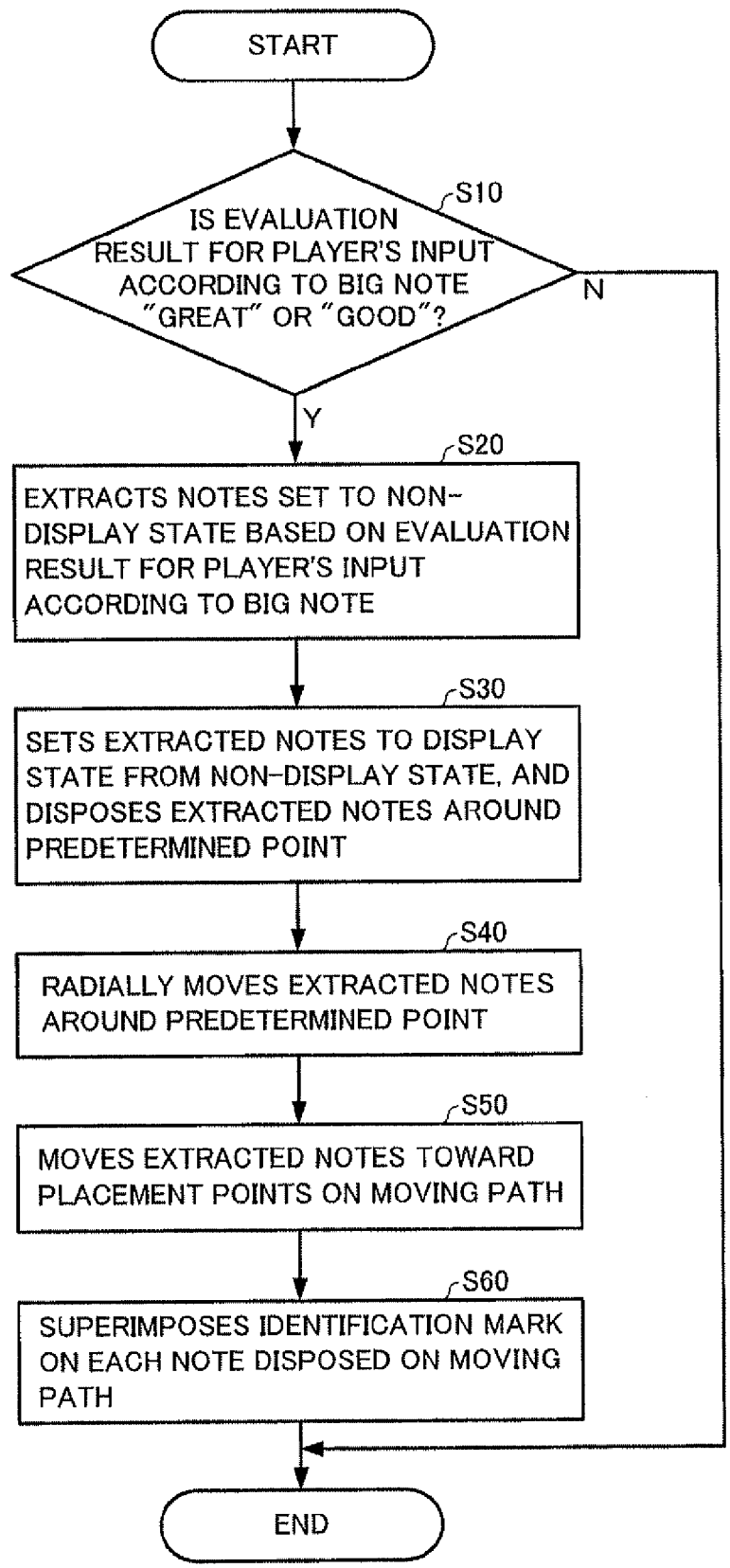
FIG. 10 is a flowchart according to one embodiment of the invention.

The flow of the process according to this embodiment that sets the note to the display state from the non-display state based on the evaluation result for the operator's input according to the big note is described below with reference to FIG. 10. The computer terminal determines whether or not the evaluation result for the operator's input according to the big note is "Great" or "Good" (step S10). When the evaluation result for the operator's input according to the big note is "Great" or "Good" (Y in step S10), the computer terminal executes a step S20. When the evaluation result for the operator's input according to the big note is not "Great" or "Good" (e.g., when the evaluation result for the input performed by the operator is "Miss" or could not be obtained) (N in step S10), the computer terminal finishes the process.

The computer terminal extracts the notes set to the non-display state based on the evaluation result for the operator's input according to the big note (step S20). The computer terminal sets the extracted notes to the display state from the non-display state, and disposes the notes around the predetermined point (step S30).

The computer terminal then radially moves the extracted notes around the predetermined point (step S40). The computer terminal then moves the extracted notes toward the placement points on the moving path (step S50). The computer terminal then superimposes the identification mark on each of the notes disposed on the moving path (step S60). The process is thus completed.

6. Application Example 6.1. Match Between a Plurality of Operators

This embodiment may also be applied to the case of evaluating the input performed by a first operator P1 and the input performed by a second operator P2 while reproducing identical music data.

Figure 11:
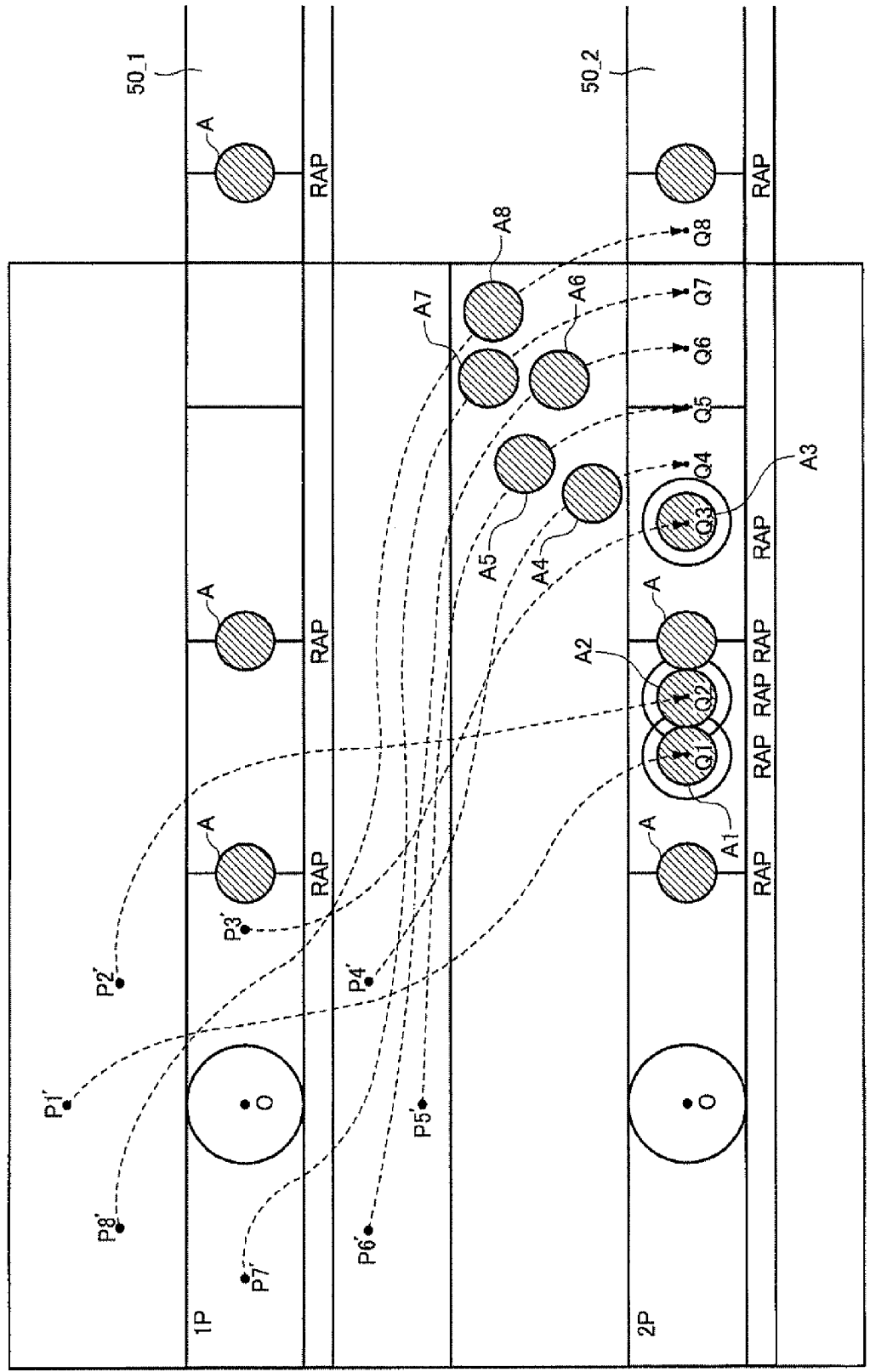
FIG. 11 illustrates an example of an image that is displayed when a plurality of operators play a match according to one embodiment of the invention.

As illustrated in FIG. 11, a moving path 50_1 for the first operator (1P) and a moving path 50_2 for the second operator (2P) are displayed on the display section, and the notes are moved along the moving path 50_1 and the moving path 50_2 based on identical musical score data, for example.

A big note X_big is displayed on the moving path 50_1 for the first operator and the moving path 50_2 for the second operator.

For example, when the evaluation result for the input performed by the first operator according to the big note X_big displayed on the moving path 50_1 is "Great" or "Good", the notes set to the non-display state according to the evaluation result for the input performed by the second operator are set to the display state from the non-display state instead of the notes set to the non-display state according to the evaluation result for the input performed by the first operator. Specifically, when the evaluation result for the input performed by the first operator is "Great" or "Good", the reference timings by the second operator are changed the non-evaluation property to the evaluation property. In this case, the notes A1 to A8 displayed around the predetermined point O for the first operator may be moved to the placement points Q1 to Q8 on the moving path 50_2 for the second operator, as illustrated in FIG. 11. When the evaluation result for the input performed by the second operator according to the big note X_big displayed on the moving path 50_2 is "Great" or "Good", the notes set to the non-display state according to the evaluation result for the input performed by the first operator are set to the display state from the non-display state instead of the notes set to the non-display state according to the evaluation result for the input performed by the second operator. Specifically, when the evaluation result for the input performed by the second operator is "Great" or "Good", the reference timings by the second operator are changed the non-evaluation property to the evaluation property.

6.2. Application Example of Identification Display

In this embodiment, when setting the note set to the non-display state in the musical score data to the display state based on execution of an event program or execution of a program based on a predetermined condition, the identification mark may be superimposed on the note that has been set to the display state.

For example, when setting the note set to the non-display state in the musical score data to the display state when the score X has exceeded a predetermined value or during a predetermined bonus period, the identification mark may be superimposed on the note that has been set to the display state from the non-display state. In this case, a different identification mark may be used for each program.

As the method of differentiating the note set to the display state from the non-display state from the note set to the display state in advance, the note set to the display state from the non-display state may be displayed translucently, shaded, or changed in shape or color.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A non-transitory computer-readable information storage medium storing a program that performs processing for reproducing music data and evaluating an input performed by an operator, the program causing a computer to function as:
   a storage section that stores a plurality of musical reference timings each having an evaluation property or a non-evaluation property for the music data, the musical reference timings including a first musical reference timing having an evaluation property and a plurality of second musical reference timings having a non-evaluation property for the music data, wherein the evaluation property allows an associated musical reference timing to be evaluated against the input performed by the operator;
   a display control section that displays an instruction mark representing a musical reference timing having an evaluation property including more than two non-overlapping evaluation time periods, each musical reference timing including a center that is included in one of the evaluation time periods;
   an evaluation section that conducts an evaluation of the input performed by the operator by comparing the first musical reference timing having the evaluation property with a timing of the input performed by the operator, the input performed by the operator falling within one of the non-overlapping evaluation periods; and
   for each second musical reference timing, a change section that changes the non-evaluation property of the second musical reference timing to an evaluation property based on a result of the evaluation of within which of the non-overlapping evaluation periods the input falls, and wherein:
   the number of instructions marks to be displayed increases in real-time based on the evaluation result for the input performed by the operator,
   the display control section sets an instruction mark of a second musical reference timing to the display state from the non-display state when the non-evaluation property of the second musical reference timing is changed to the evaluation property, and
   a feedback is provided to the operator based on the evaluation.

2. The non-transitory computer-readable information storage medium as defined in claim 1, the program causing the computer to further function as:
   a display control section that moves instruction marks respectively representing a plurality of musical reference timings having the evaluation property along a moving path toward a predetermined point on the moving path,
   wherein the display control section provides the feedback by moving one of the instruction marks representing the second musical reference timing radially from around the predetermined point and then along the moving path.

3. The non-transitory computer-readable information storage medium as defined in claim 1, the program causing the computer to further function as:
   a display control section that moves instruction marks respectively representing a plurality of musical reference timings having the evaluation property along a moving path toward a predetermined point on the moving path,
   wherein the display control section provides the feedback by moving one of the instruction marks representing the second musical reference timing from around the predetermined lined point to a placement point on the moving path and then along the moving path, the placement point corresponding to the one of the instruction marks.

4. A computer terminal that reproduces music data and evaluates an input performed by an operator, the computer terminal comprising:
   a storage section that stores a plurality of musical reference timings each having an evaluation property or a non-evaluation property for the music data, the musical reference timings including a first musical reference timing having the evaluation property and a plurality of second musical reference timings having the non-evaluation property for the music, wherein the evaluation property allows an associated musical reference timing to be evaluated against the input performed by the operator;
   a display control section that displays an instruction mark representing a musical reference timing having an evaluation property including more than two non-overlapping evaluation time periods, each musical reference timing including a center that is included in one of the evaluation time periods;
   an evaluation section that conducts an evaluation of the input performed by the operator by comparing the first musical reference timing having the evaluation property with a timing of the input performed by the operator, the input performed by the operator falling within one of the non-overlapping evaluation periods; and
   for each second musical reference timing, a change section that changes the non-evaluation property of the second musical reference timing to the evaluation property based on a result of the evaluation of within which of the non-overlapping evaluation periods the input falls, and wherein:

the number of instructions marks to be displayed increases in real-time based on the evaluation result for the input performed by the operator, the display control section sets an instruction mark of a second musical reference timing to the display state from the non-display state when the non-evaluation property of the second musical reference timing is changed to the evaluation property, a feedback is provided to the operator based on the evaluation.

5. A change method that is implemented by a computer terminal that reproduces music data, evaluates an input performed by an operator, and includes a processor, the method comprising:

storing a plurality of musical reference timings having an evaluation property or a non-evaluation property for the music data, the musical reference timings including a first musical reference timing having the evaluation property and a plurality of second musical reference timings having the non-evaluation property for the music, wherein the evaluation property allows an associated musical reference timing to be evaluated against the input performed by the operator;

displaying an instruction mark representing a musical reference timing having an evaluation property including more than two non-overlapping evaluation time periods, each musical reference timing including a center that is included in one of the evaluation time periods;

conducting an evaluation of the input performed by the operator by comparing the first musical reference timing having the evaluation property with a timing of the input performed by the operator, the input performed by the operator falling within one of the non-overlapping evaluation periods;

for each second musical reference timing, changing the non-evaluation property of the second musical reference timing to the evaluation property based on a result of the evaluation of within which of the non-overlapping evaluation periods the input falls; and providing a feedback to the operator based on the evaluation, wherein:

the number of instructions marks to be displayed increases in real-time based on the evaluation result for the input performed by the operator, and the displaying step sets an instruction mark of a second musical reference timing to the display state from the non-display state when the non-evaluation property of the second musical reference timing is changed to the evaluation property.

* * * * *